(12) United States Patent
Nitta et al.

(10) Patent No.: US 6,322,239 B1
(45) Date of Patent: Nov. 27, 2001

(54) VEHICLE LAMP WITH A BACK COVER HAVING A TERMINAL

(75) Inventors: Kazuto Nitta; Hironori Tsukamoto; Masatoshi Yoneyama, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/517,452

(22) Filed: Mar. 2, 2000

(30) Foreign Application Priority Data

Mar. 3, 1999 (JP) .................................................. 11-056184

(51) Int. Cl.⁷ ...................................................... B60Q 3/04
(52) U.S. Cl. .......................... 362/543; 362/549; 362/265; 362/375
(58) Field of Search ...................................... 362/543, 265, 362/546, 548, 549, 374, 375, 226

(56) References Cited

U.S. PATENT DOCUMENTS

| 5,113,330 | * | 5/1992 | Makita | 362/265 |
|---|---|---|---|---|
| 5,172,972 | * | 12/1992 | Terao | 362/517 |
| 5,188,444 | * | 2/1993 | Makita et al. | 362/519 |
| 5,562,339 | | 10/1996 | Tanaka et al. | 362/519 |
| 5,664,870 | | 9/1997 | Uchida et al. | 362/459 |
| 5,678,916 | | 10/1997 | Watanabe et al. | 362/465 |
| 5,688,043 | | 11/1997 | Watanabe et al. | 362/297 |
| 5,879,073 | | 3/1999 | Hori et al. | 362/344 |
| 5,895,113 | | 4/1999 | Ozaki et al. | 362/546 |
| 5,906,428 | * | 5/1999 | Hori et al. | 362/265 |

FOREIGN PATENT DOCUMENTS 2 247 944 A  3/1992 (GB).
2 248 293 A  4/1992 (GB).

* cited by examiner

Primary Examiner—Sandra O'Shea
Assistant Examiner—Ronald E. DelGizzi
(74) Attorney, Agent, or Firm—Sughrue, Mion, Zinn, Macpeak & Seas, PLLC

(57) ABSTRACT

A vehicle lamp is provided with a feeder device for simplifying the labor of disposing feeder cords while improving accuracy. The vehicle lamp has a movable reflector tiltably supported by a lamp body via an aiming mechanism. A back cover is detachably fitted in an opening formed in the rear of the lamp body. The back cover includes a terminal for conducting the terminal of a feeder cord connected to a light source provided in the lamp body, and the terminal of a power supply cord connected to a power supply for supplying power to the light source.

6 Claims, 9 Drawing Sheets

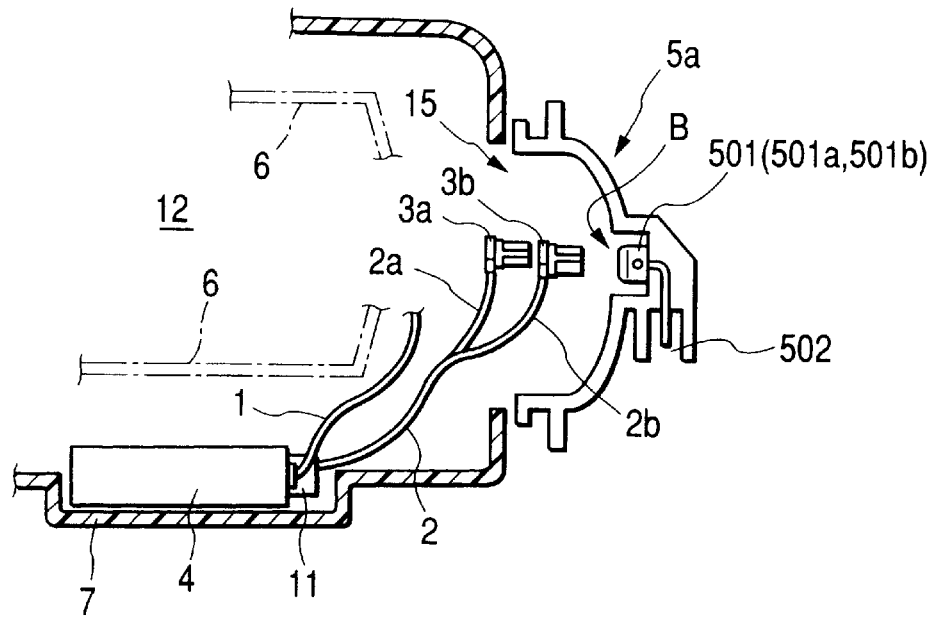
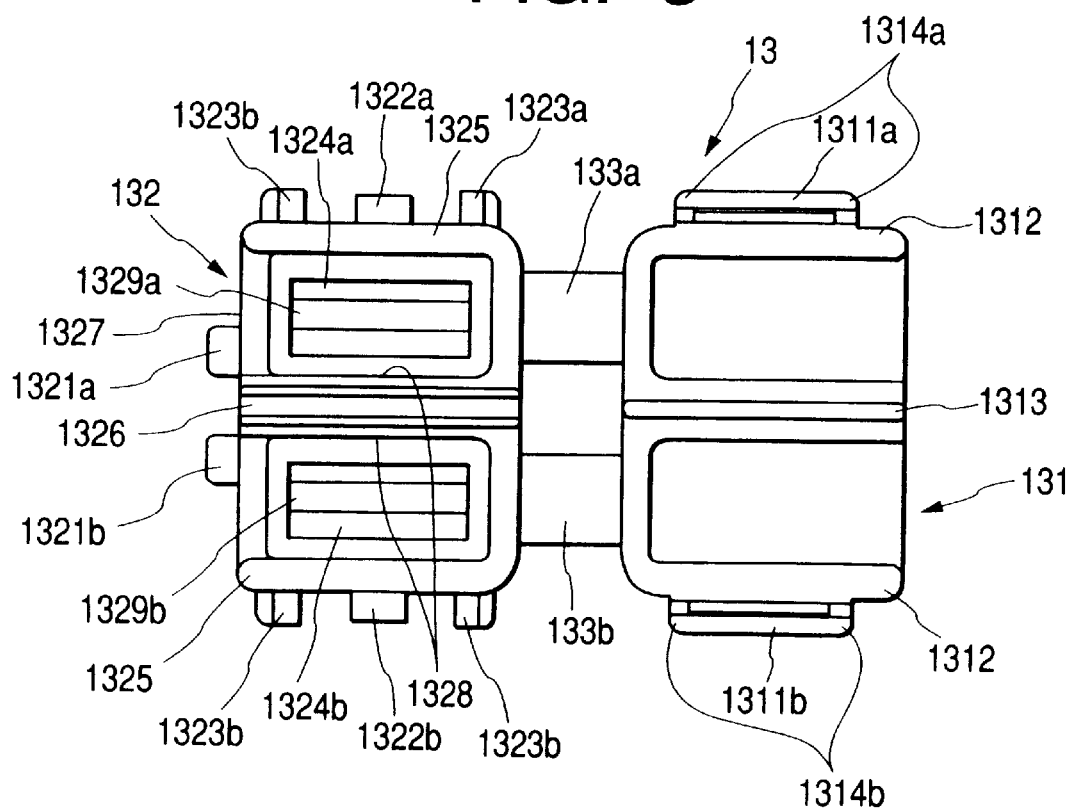

VEHICLE LAMP WITH A BACK COVER HAVING A TERMINAL

BACKGROUND OF THE INVENTION

1. Field of the Invention

This invention relates generally to vehicle lamps such as automotive headlamps, and more particularly to a vehicle lamp equipped with a predetermined feeder means for conducting a light source for the vehicle lamp and a power supply (a battery) for supplying power to the light source.

2. Description of the Related Art

A technique of the sort shown in FIG. 13 has generally been employed as a means of arranging feeder cords for a light source that is disposed in a vehicle lamp, such as an automotive headlamp. Feeder members disposed on the rear back side of a lamp body 39 forming the vehicle are connected to a predetermined power supply (a battery). More specifically, the feeder cords are connected to a light source and disposed in the rear of the lamp body in such a way as to be fitted in a lamp chamber from the back side of the lamp body.

In other words, a first feeder cord 31a connected to a light source such as a discharge bulb (not shown in FIG. 13) is connected to a ballast circuit (not shown) incorporating a ballast 34 via a lighting circuit unit (not shown) and then a second feeder cord 31b is connected to the ballast 34 via a connector 32 before being drawn out.

Further, the terminal of the second feeder cord 31b is inserted into a rubber bushing 35 that is prepared beforehand and then inserted into a feeder-cord supporting hole 38 that is formed beforehand in a lamp body member (or a bushing fixing member) 37.

The rubber bushing 35 is then forced to be fitted in the feeder-cord supporting hole 38. A connector 33 to be connected to the power supply (battery) (not shown) is fitted to the terminal of the feeder cord 31b while storing the terminal portion thereof.

The lighting circuit unit is necessary for causing lighting to be started by applying high voltage to the discharge bulb (not shown) and is a unit for storing lighting circuit forming parts such as electronic parts and a transformer. The ballast circuit is a circuit indispensable to making the discharge bulb discharge electricity stably and continuously.

Although the vehicle lamp having a reflector 36 and the discharge bulb is shown in FIG. 13 by way of example, there has also been employed, even in the case of using an incandescent bulb or a halogen bulb as a light source, the technique of inserting the bushing 35 into the first feeder cord 31a connected to the light source, fitting the bushing 35 in the predetermined feeder-cord supporting hole 38 and fitting the connector 33 to the terminal portion.

In the above-described vehicle lamp, however, the work of fitting the bushing 35 to the feeder cord 31b, inserting the terminal of the feeder cord 31b into the predetermined feeder-cord supporting hole 38 and fitting the bushing 35 into the feeder-cord supporting hole 38 is considerably complicated and labor intensive. Particularly in the case of a vehicle lamp having the reflector 36 and the discharge bulb, the work tends to become roundabout and troublesome because the space 40 in the rear of the light source is narrow.

SUMMARY OF THE INVENTION

An object of the present invention is to provide a vehicle lamp having a feeder means capable of improving assembling conditions of various members relating to arranging feeder cords of the vehicle lamp such as an automotive headlamp, simplifying and facilitating the work of disposing feeder cords and increasing the certainty of the work of disposing feeder cords.

In order to accomplish the object above, the following means are employed according to the invention:

A vehicle lamp comprises a movable reflector tiltably supported by a lamp body via an aiming mechanism, wherein a back cover is detachably fitted in an opening formed in the rear back of the lamp body, and is characterized in that the back cover includes a terminal for conducting the terminal of a feeder cord so disposed as to be connected to a light source provided in the lamp body and the terminal of a power supply cord so disposed as to be connected to a power supply for supplying power to the light source.

The back cover employed according to this means acts as a relay member (a connector member) for connecting the terminal of the feeder cord to the cord terminal conducting over the power supply, thus demonstrating the function of simplifying and facilitating the work of disposing the feeder cords.

In particular, since the number of parts in the vicinity of the light source increases when the movable reflector is arranged in the lamp chamber, the area in the lamp chamber or in the rear of the light source is restricted and narrowed, and the means of connecting the feeder cord and the power supply cord via the back cover becomes more effective.

The feeder cord includes a first feeder cord connected to a discharge bulb forming a light source, and a second feeder cord drawn from a discharge circuit unit to which the first feeder cord is connected.

This means is applied to a vehicle lamp employing a discharge bulb in a metal halide lamp. In such a vehicle lamp having a unit (called a discharge circuit unit) incorporating a ballast circuit for making the discharge bulb discharge electricity stably and continuously (and also a lighting circuit indispensable to having lighting started by applying high voltage to the discharge bulb), the first feeder cord for connecting the discharge circuit unit and the discharge bulb and the second feeder cord that is connected to the discharge circuit unit and drawn therefrom are provided. Then the feeder cord and the power supply can easily be connected via the back cover by connecting the terminal of the second feeder cord to the terminal of the back cover.

A flag-type terminal formed in a direction perpendicular to the feeder cord is provided to the terminal of the feeder cord connected to the terminal of the feeder cord.

As the flag-type terminal is employed according to this means, the feeder cord is extended and easily connected to the back cover because a connector case storing the flag-type terminal portion can be directed perpendicularly to the feeder cord.

The feeder cord is connected to the terminal of the back cover via a connector case for storing the terminal of the feeder cord.

Though the work of connecting the positive and negative terminals of the feeder cord to the positive and negative terminals of the back cover has to be done twice normally, such work can be done once because it is done via the connector. Moreover, because the terminal of the feeder cord and the terminal provided to the terminal thereof is not exposed, measures to counter fire hazard can be effectively taken.

The connector case and the back cover are so arranged that the terminal of the feeder cord may be prevented from being reversely connected to the terminal of the back cover and that a reverse-fitting preventive region is provided on the outer wall of a case forming the connector case, and an area for receiving the reverse-fitting preventive region is formed in the back cover.

According to this means, the positive and negative terminals of the feeder cord can be prevented from being reversely fitted in the positive and negative terminals of the back cover.

More specifically, since the reverse-fitting preventive regions are not fitted in the predetermined respective regions of the back cover even when it is attempted to reversely insert the connector case into the back cover, the reverse-fitting is preventable. Moreover, any worker is able to instantly find the reverse-fitting.

BRIEF DESCRIPTION OF THE DRAWING

The above objects and advantages of the present invention will become more apparent by describing in detail preferred embodiments thereof with reference to the attached drawings in which:

FIG. 1 is a schematic view of a means for feeding power to a light source as a first embodiment disposed on the rear back side of a vehicle lamp according to the invention;

FIG. 3 is a plan view of the connector case;

DETAILED DESCRIPTION OF THE PREFERRED EMBODIMENT

The preferred embodiments of the invention will now be described with reference to the accompanying drawings.

Figure 2A:
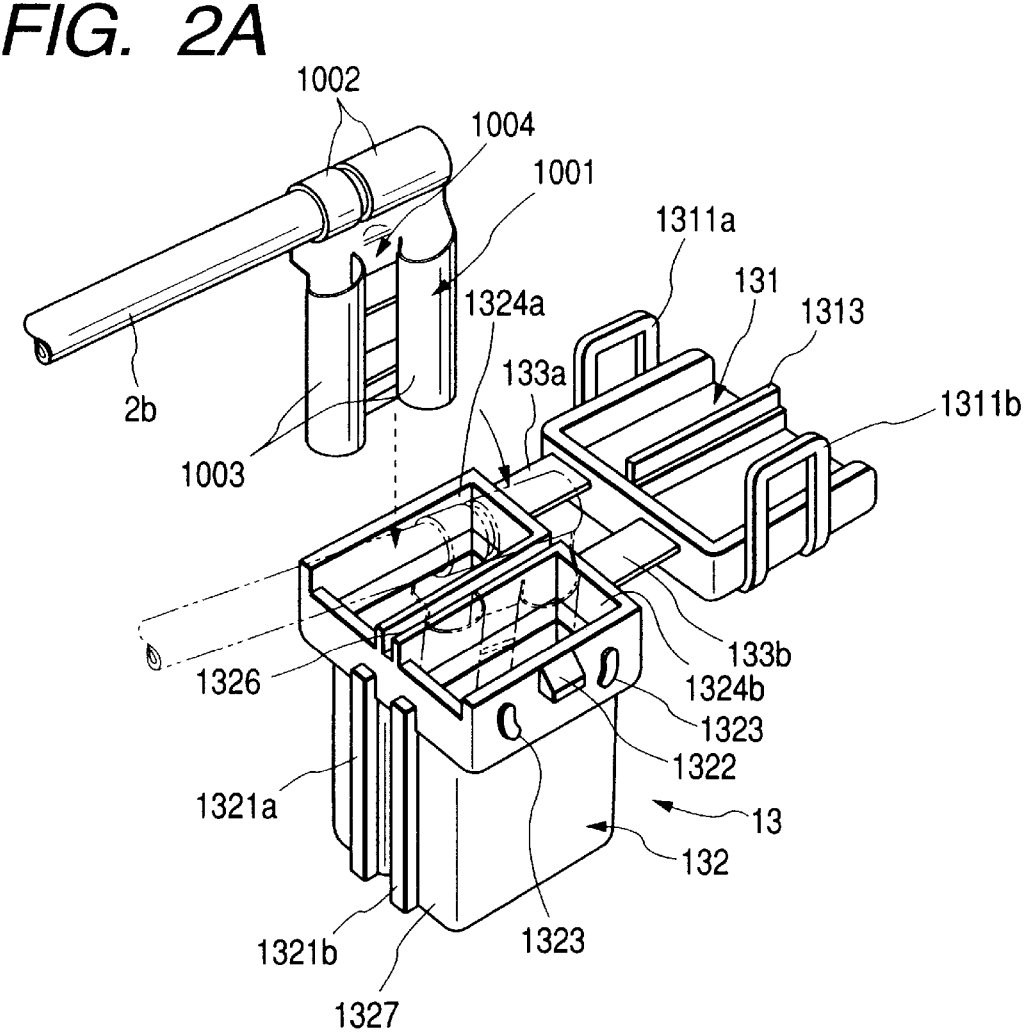
FIG. 2A is a condition in which the terminal of a feeder cord is connected to a connector case in a feeder means as a second embodiment of the invention.
Figure 4A:
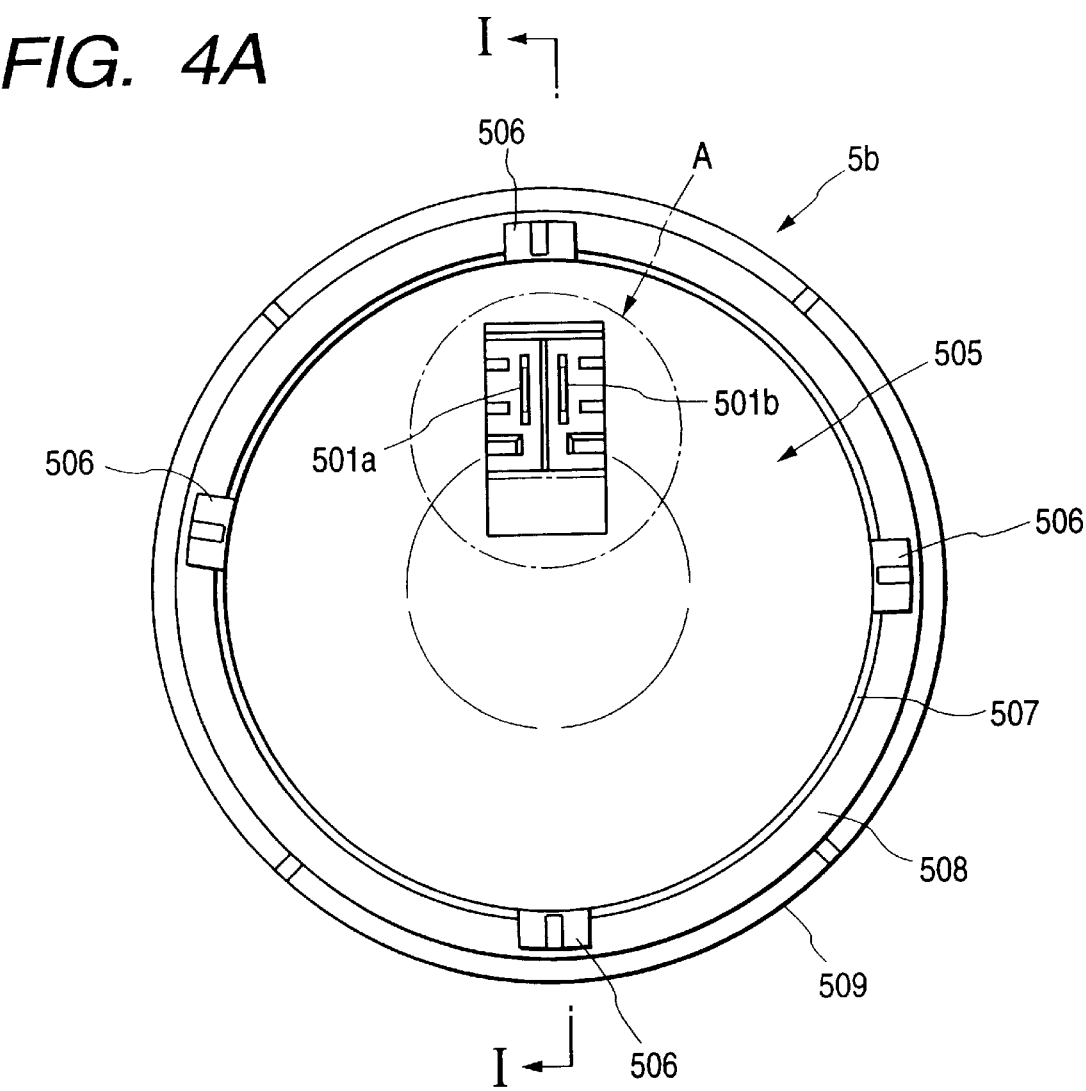
FIG. 4A is an elevational view of a back cover as seen from the inside (light source side)

FIG. 1 is a schematic view of a means for feeding power to a light source as a first embodiment disposed on the rear back side of a vehicle lamp according to the invention. FIG. 2A refers to a condition in which the terminal of a feeder cord 1 is connected to a connector case 13 in a feeder means as a second embodiment of the invention and FIG. 2B to a condition in which the terminal thereof is stored in the connector case 13. FIG. 3 is a plan view of the connector case 13. FIG. 4A is an elevational view of a back cover as seen from the inside (light source side) and FIG. 4B, an enlarged view of a connector fitting portion (A portion) formed on the inside of the back cover.

Figure 6:
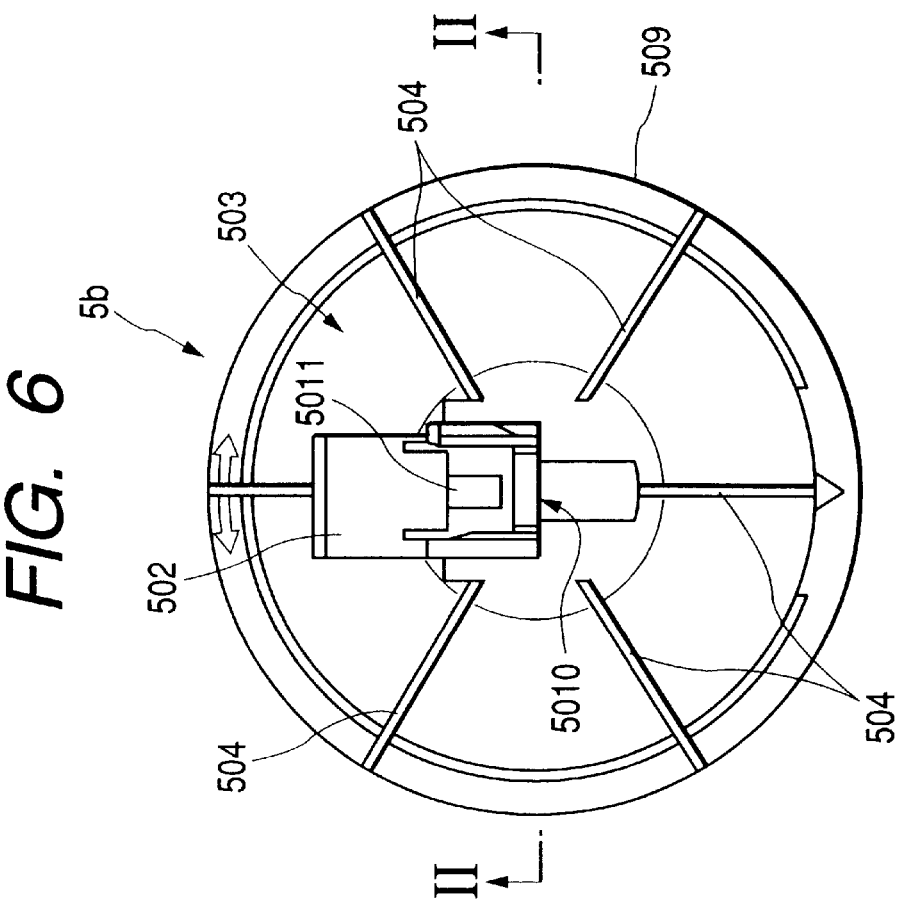
FIG. 6 is a rear elevation of the back cover.
Figure 5:
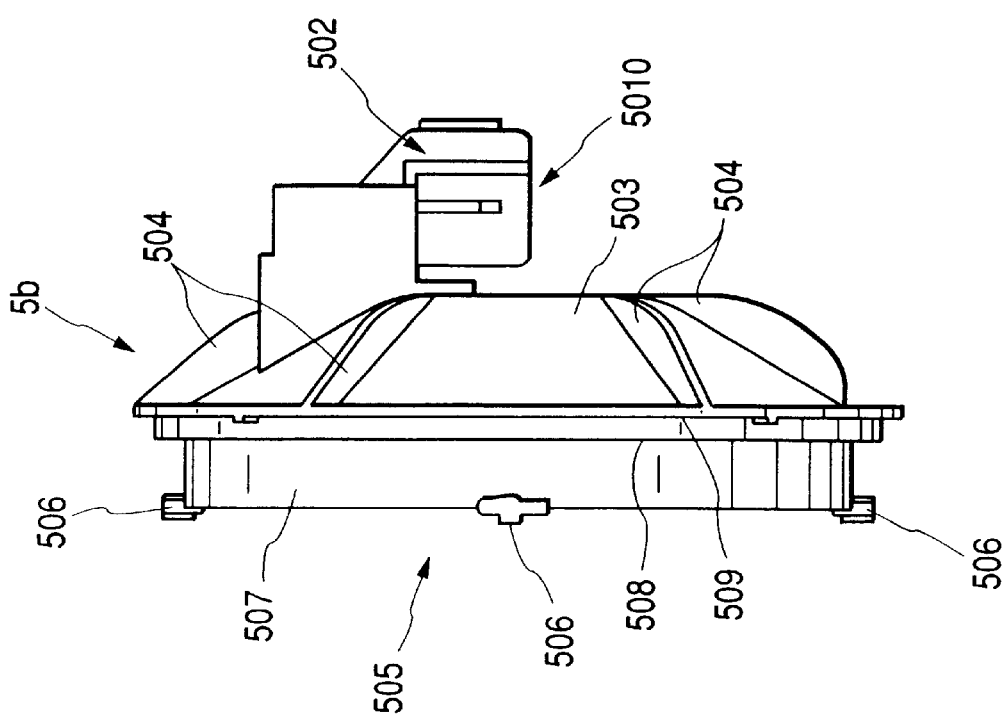
FIG. 5 is a side view of the back cover used in the second embodiment of the invention.
Figure 7A:
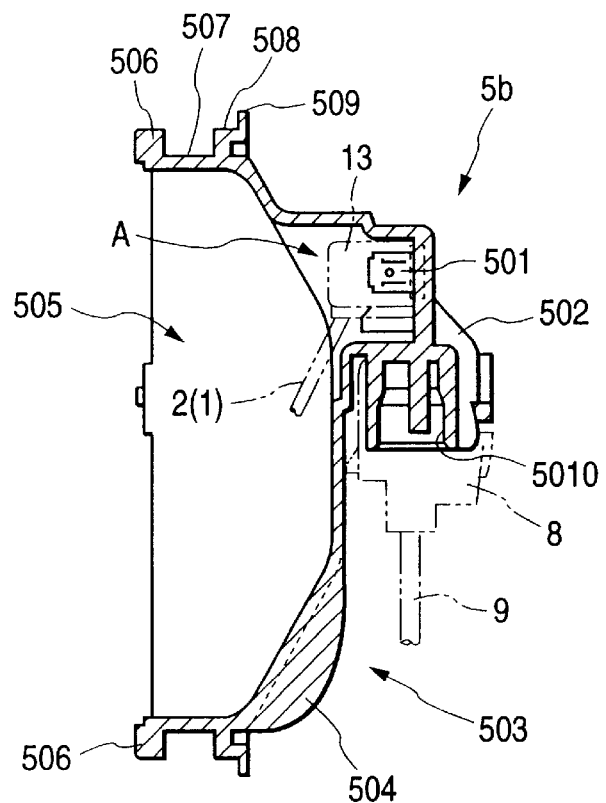
FIG. 7A is a sectional view taken on line I—I of FIG. 4A showing the back cover.
Figure 7B:
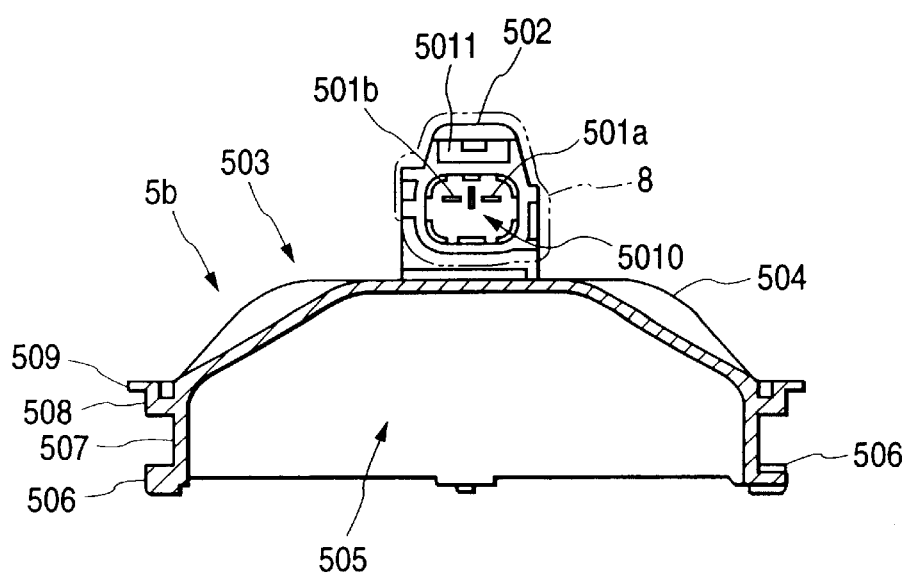
FIG. 7B is a sectional view taken on only II—II of FIG. 6 showing the back cover.
Figure 8:
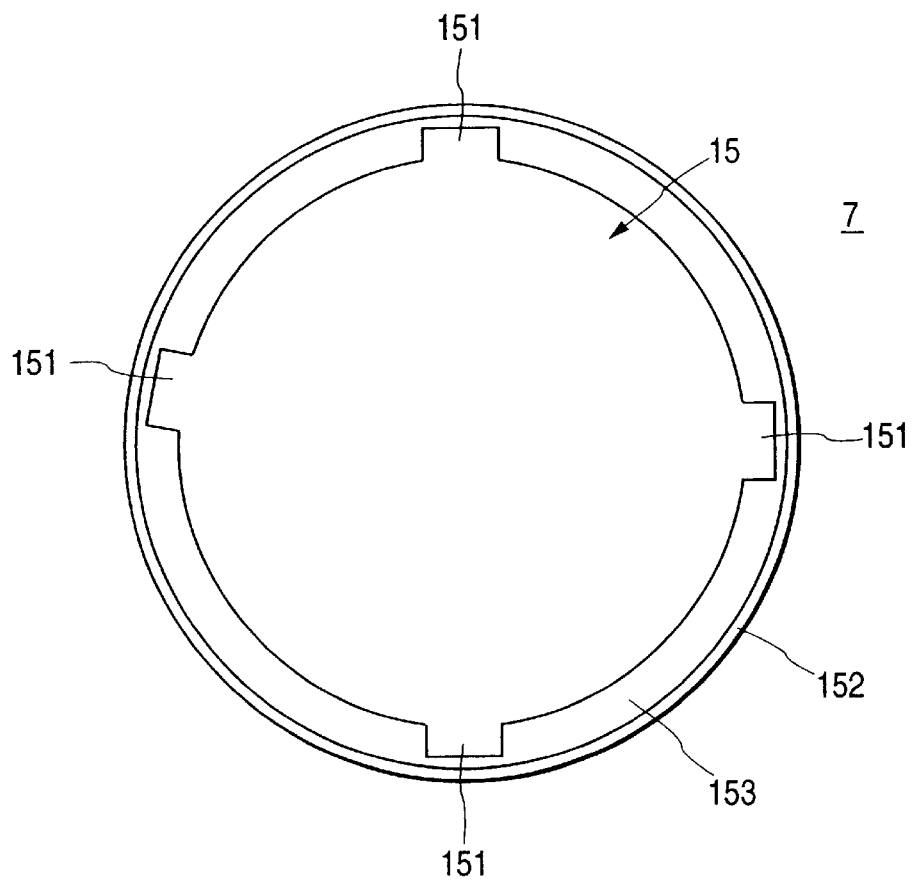
FIG. 8 is an elevational view of an opening formed in the rear back of a lamp body.
Figure 9:
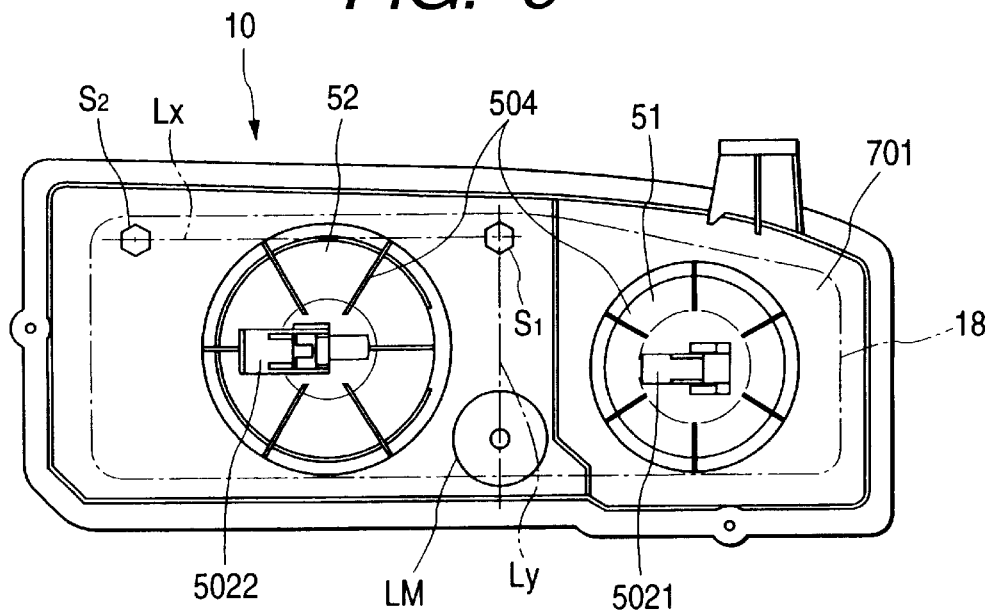
FIG. 9 is an elevational view of back covers and fitted to the back of a lamp body of a four-lamps type headlamp.
Figure 10:
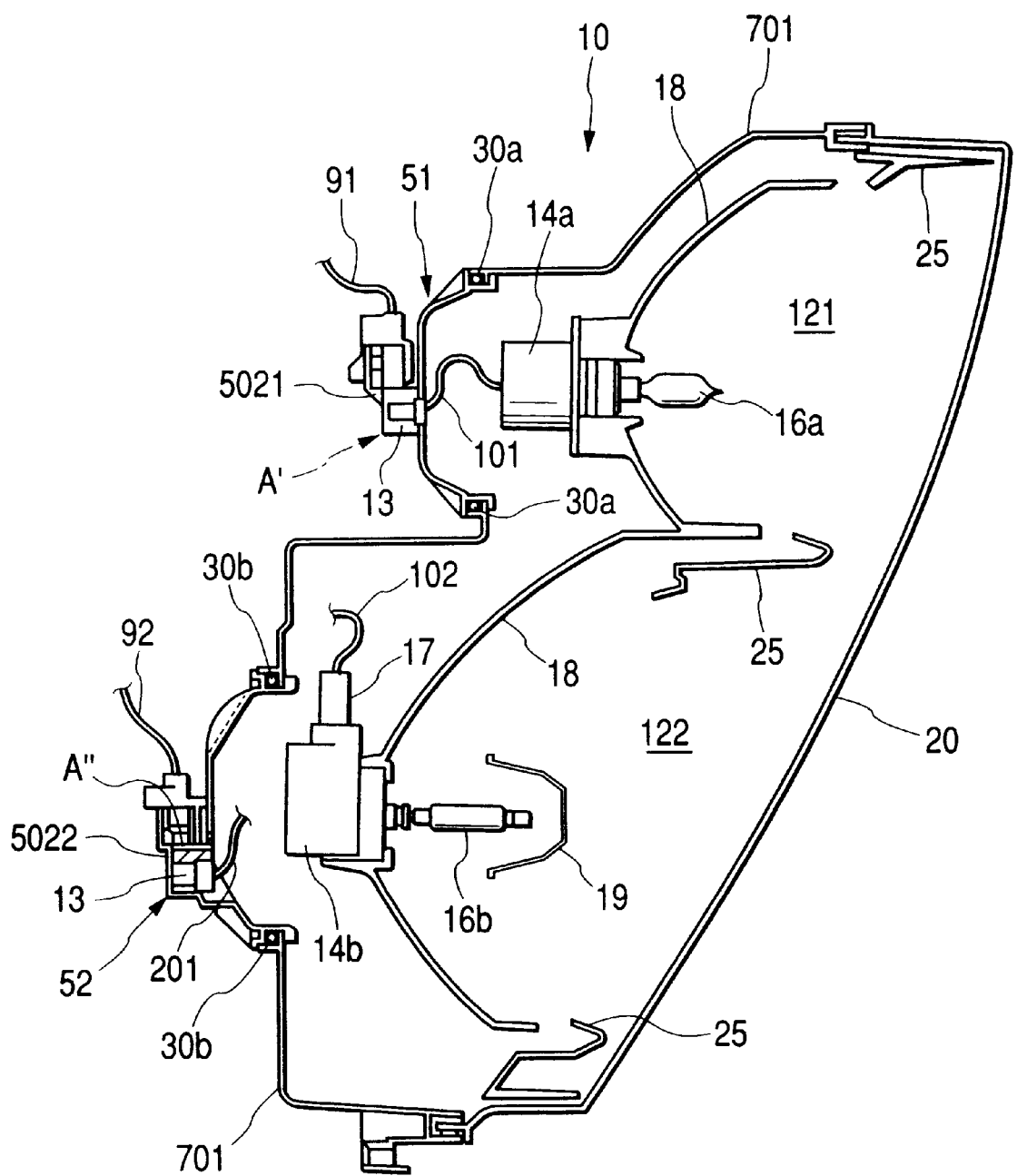
FIG. 10 is a horizontal section view showing a condition in which the back covers are fitted to the rear back of the lamp body.
Figure 11:
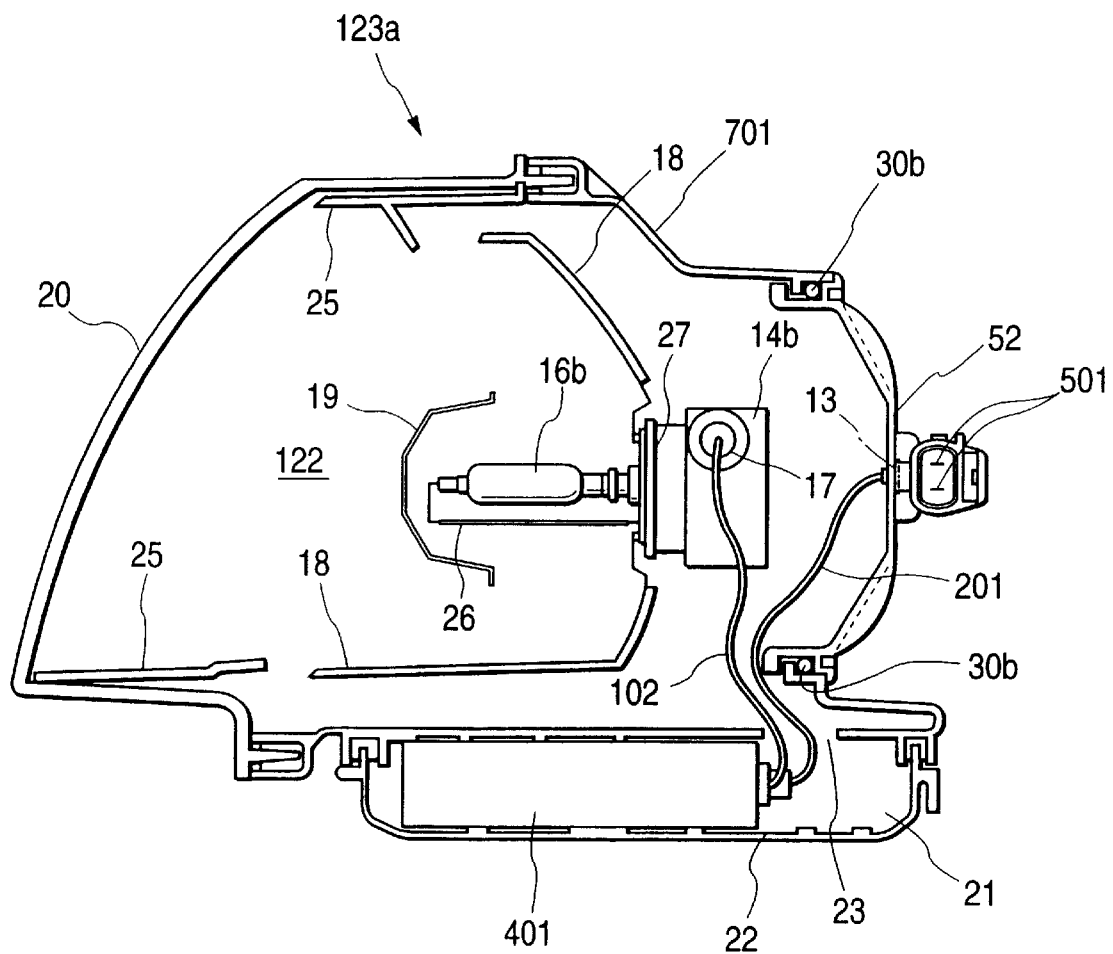
FIG. 11 is a side view of a (discharge) bulb as a sub-beam forming part of the four-lamps type head lamp.
Figure 12:
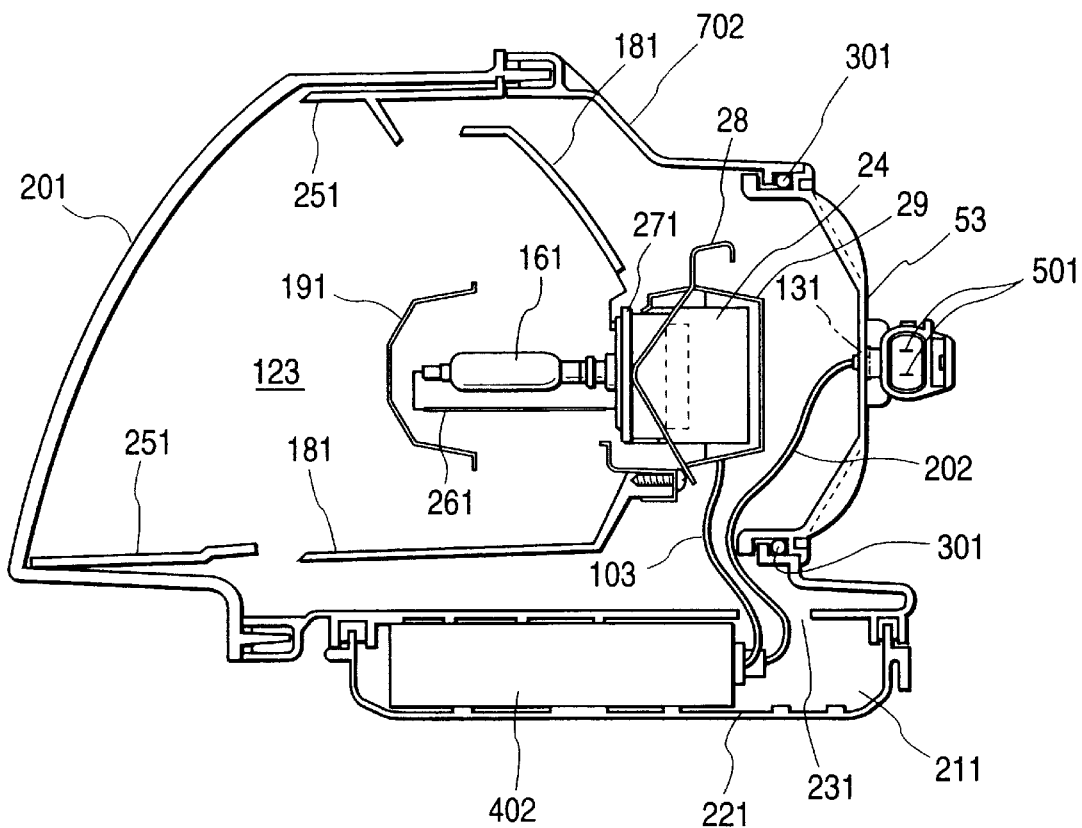
FIG. 12 is a side view of a modified embodiment of a vehicle lamp having a discharge lamp according to the invention.
Figure 13:
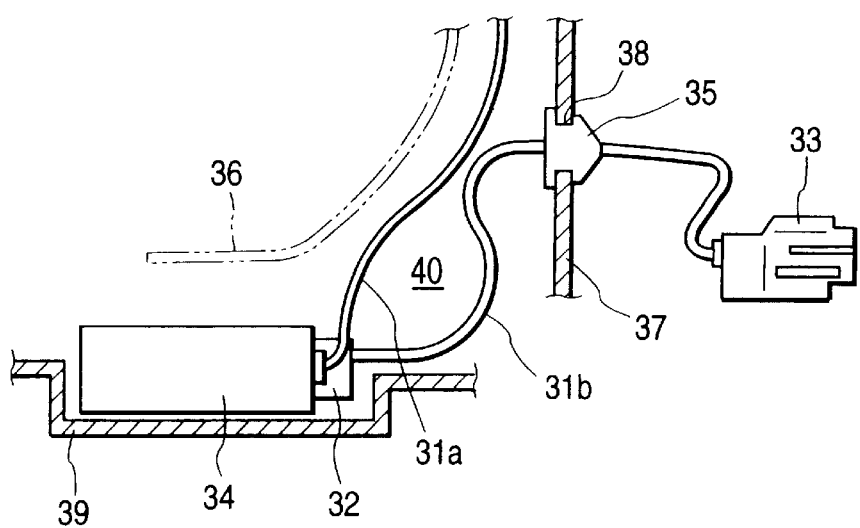
FIG. 13 is a schematic diagram illustrating the prior art.

FIG. 5 is a side view of the back cover used in the second embodiment of the invention. FIG. 6 is a rear elevation of the back cover. FIG. 7A is a sectional view taken on line I—I of FIG. 4A showing the back cover and FIG. 7B, a sectional view taken on only II—II of FIG. 6. FIG. 8 is an elevational view of an opening formed in the rear back of a lamp body. FIG. 9 is an elevational view of back covers 51 and 52 fitted to the back of a lamp body 701 of a four-lamps type headlamp 10. FIG. 10 is a horizontal section view showing a condition in which the back covers 51 and 52 are fitted to the back of the lamp body 701. FIG. 11 is a side view of a (discharge) bulb 16b as a sub-beam forming part of the four-lamps type head lamp 10. FIG. 12 is a side view of a modified embodiment of a vehicle lamp having a discharge lamp according to the invention.

Reference numerals 1 and 2 in FIG. 1 denote feeder members disposed on the rear back side. of the vehicle lamp according to the invention, schematically showing feeder cords for supplying power from a power supply (not shown) to the light source (not shown in FIG. 1) so installed as to face onto a lamp chamber 12 in a lamp body 7.

In this case, according to this embodiment of the invention, a first feeder cord 1 that is drawn from the light source (not shown) (or drawn via a lighting circuit unit) is connected to a ballast 4 and a second feeder cord 2 is drawn from the ballast 4 via a connector 11. In the case of an incandescent bulb, a halogen bulb or the like, however, only the feeder cord 1 is drawn from the light source without the aid of such a ballast.

One end of the second feeder cord 2 is connected to the ballast 4 via the connector 11, its positive and negative ends 2a and 2b being secured to terminals 3a and 3b, respectively. By the ballast is meant that it is a member in which a ballast circuit unit is stored so as to stabilize the discharging of the discharge bulb; however, it may be a lighting circuit for turning on the discharge bulb by applying high voltage thereto.

Reference numeral 5a denotes a member (back cover) to be fitted into an opening 15 for simultaneous use as a light-source fitting hole that is substantially circular and opened in the back of the lamp body 7, the member being turned by a predetermined angle in the peripheral direction of the opening 15. This member schematically forms a substantially bowl-shaped back cover according to this embodiment of the invention.

Positive and negative terminals 501 (501a and 501b) as a pair are projected and exposed in an area B of the inner bottom portion of the back cover 5a. Further, the positive and negative terminals 501 are also strung out and exposed toward a connector fitting hole (or portion) 502 for receiving the power supply, the connector fitting hole 502 being formed in the rear back of the back cover 5a.

In the work of connecting the terminals 3a and 3b of the second feeder cord 2 to the respective positive and negative terminals 501a and 501b provided on the back cover 5a before fitting the back cover 5a in the opening 15, it is desirable to connect the second feeder cord 2 and the power supply (not shown in FIG. 1) even in a narrow area in the rear of the light source and in the vicinity of the periphery of the rear back of the lamp body 7. In other words, the back cover 5a effectively plays a role as a relay member (a connector member) in connecting the second feeder cord 2 simply to the power supply.

Reference numeral 6 shown by an imaginary line simply denotes a reflector disposed in the lamp chamber 12 of the lamp body 7. The ballast 4 may be installed on, but not limited to, an inner or outer side of the lamp body 7.

Reference numeral 13 in FIG. 2 denotes a member to be used in a second embodiment of a means for supplying power to the light source (not shown) according to the invention, that is, a connector case for storing the terminals 3a and 3b of the second feeder cord 2 so as to bring them into one connecting member.

The adoption of the connector case 13 results efficiently reducing the work of connecting both the terminals 3a and 3b to the respective terminals 501a and 501b via the connector case 13 together into one step.

As the terminals 3a and 3b of the second feeder cord 2 to be stored in the connector case 13, there may be employed so-called flag type terminals 1001 (1001a and 1001b) that are formed in a direction perpendicular to the respective positive and negative terminals 2a and 2b of the second feeder cord 2.

Employing the flag type terminals 1001 allows the connector case 13 (for storing the portion of the flag type terminals 1001) to be directed perpendicularly to the second feeder cord 2, whereby it facilitates the connection of the second feeder cord 2 to a special connector fitting portion A formed in the back cover 5b as will be shown in FIG. 5 and so on by extending the second feeder cord 2.

A specific combination of the flag type terminals 1001 and connector case 13 will now be described.

The flag type terminals 1001 are formed by rounding flat terminal members in the upper end portions of the terminals 1001 in the form of a roll, including terminal fixing portions 1002 each having a hole for receiving (a conductor of) each of the positive and negative terminals of the second feeder cord 2, a pair of substantially semicircular columnar projections 1003 that are formed by laterally rounding the terminal members in the form of a roll, and a terminal inserting hole 1004 that is formed in the inside area between the projections 1003 and communicates therewith.

The terminal fixing portions 1002 play the roles in fixedly caulking the positive and negative terminals 2a and 2b (of the second feeder cord 2) inserted from the outside. The projections 1003 are formed as portions for use in inserting the connector case 13 into holes 1324 (1324a and 1324b) as will be described below. Terminal-inserting holes 1004 are portions into which the terminals 501 (501a and 501b) are directly inserted as will also be described later.

The connector case 13 will be described in detail with reference to FIGS. 2 and 3.

The connector case 13 generally includes a case portion 132 and a cover portion 131 that is formed in such a way as to cover the upper end portion of the case portion 132 by folding flexible coupling portions 133 (133a and 133b) via the upper end portion of the case portion 132.

The case portion 132 looks like a substantially quadrangular prism-shaped container opened upward and is provided with two terminal storing holes 1324a and 1324b with a central partition wall 1328 provided therebetween.

Figure 4B:
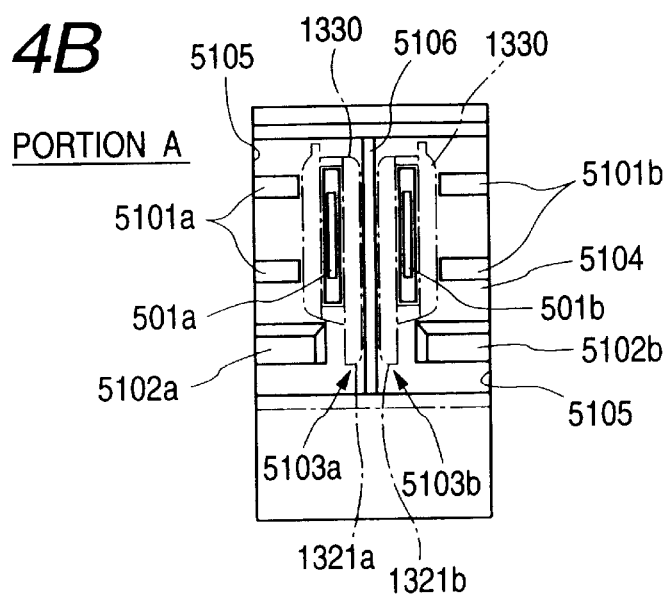
FIG. 4B is an enlarged view of a connector fitting portion (A portion) formed on the inside of the back cover.

Further, a pair of vertical reverse-fitting preventive projections 1321 (1321a and 1321b) are placed side by side on the front-side wall 1327 on the side as one of the side walls constituting the case portion 132 to which the second feeder cords (2a and 2b) 2 are extended. The reverse-fitting preventive projections 1321a and 1321b are regions to be fitted in reverse-fitting preventive grooves 5103 (5103a and 5103b; FIG. 4B) formed in the connector fitting portion (A) of the back cover 5b which will be described later, so that the connector case 13 can be fitted to the connector case fitting portion (A) in a predetermined direction.

Substantially triangular prism-shaped cover retaining projections 1322 (1322a and 1322b) are formed in the upper end portions of the lateral side walls of the case portion 132. A pair of stoppers 1323a and 1323b are projected in such a way as to surround each of the cover retaining projections 1322a and 1322b.

A pair of rectangular terminal inserting holes 1329 (1329a and 1329b) are formed in the bottom portion of the case portion 132. These terminal inserting holes 1329a and 1329b are holes into which the terminals 501a and 501b (of the back cover 5b) as will be described below are inserted with respect to the terminal inserting holes 1004 of the terminals 1001 stored in the terminal storing holes 1324a and 1324b.

The cover portion 131 is provided with a pair of substantially U-shaped engaging frames 1311a and 1311b that engage with the retaining projections 1322a and 1322b when the cover portion 131 is combined with the case portion 132, the engaging frames 1311a and 1311b being provided to the respective lateral side walls. The engaging frames 1311a and 1311b are made to engage with the retaining projections 1322a and 1322b so that the lower angular portions 1314a and 1314b of the engaging frames may face the stoppers 1323a and 1323b. In other words, stoppers 1323a and 1323b play the role in preventing the cover portion 131 from being excessively held down.

A projection 1313 is provided in the central portion of the cover portion 131. This projection 1313 is fitted into a groove 1326 formed in the upper portion of the central wall 1328 of the case portion 132 whereby to prevent the cover portion 131 from laterally shifting.

In this case, a pair of feeder-cord drawing holes 134 in the upper portion of the front side wall 1327 when the cover portion 131 engages with the case portion 132.

Figure 2B:
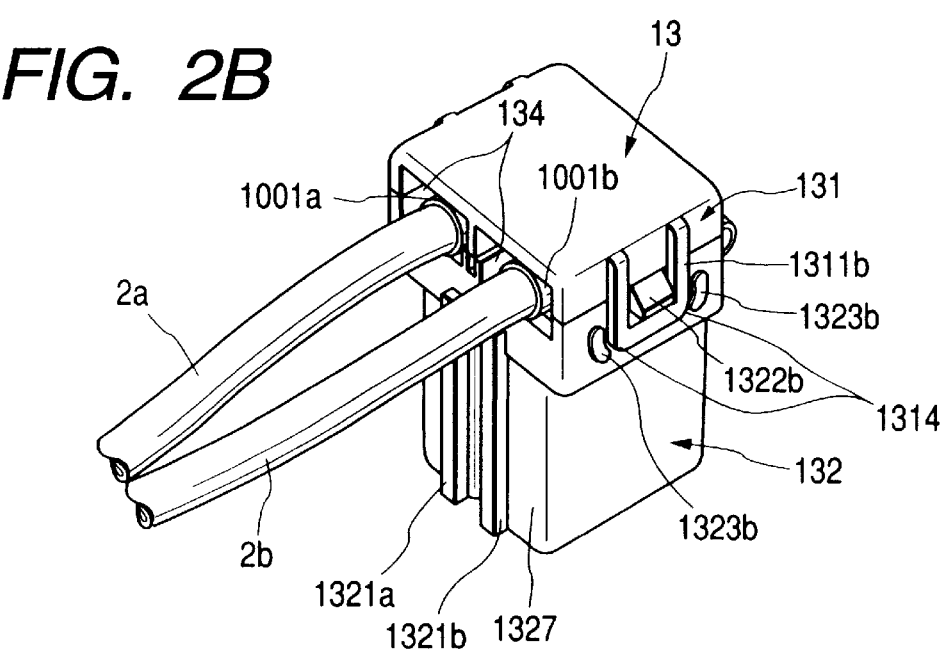
FIG. 2B is a condition in which the terminal thereof is stored in the connector case.

FIG. 2B shows a state in which the cover portion 131 has been fitted to the case portion 132 after the terminals 1001 of the second feeder cord 2 (2a and 2b) are stored in the holes 1324a and 1324b of the connector case 13 thus constructed.

An embodiment of the back cover 5b for use according to the invention will now be described with reference to FIGS. 4 to 8.

The back cover 5b is a substantially bowl-shaped member made of synthetic resin or the like. The back cover 5b is formed in the rear back of the lamp body 7 and fitted into a substantially circular opening 15 (see FIG. 8). The back cover 5b is also a relay member (a connector member) for connecting the second feeder cord 2 (a first feeder cord 1 in a case where a light source such as an incandescent bulb and a halogen bulb) to a power supply cord 9 (see FIG. 7).

First, a connector-case fitting portion denoted by A is provided in a predetermined recessed configuration in the inner surface of a side 505 facing the opening 15 shown in FIG. 8. Further, a substantially cylindrical fitting port 507 as a fitting portion to the opening 15 is projected.

A retaining projection 506 is provided outwardly in four peripheral places of the front end portion of the fitting port 507. This retaining projections 506 are fitted into four cutouts 151 (see FIG. 8) formed in the opening 15 before being made to engage with the opening 15 by turning the back cover 5a peripherally by a predetermined angle.

In this case, a first flat portion 508 formed on the outer periphery of the base of the fitting port 507 of the back cover 5b faces the flat portion 153 of the opening 15 via an O-ring (not shown). A second flat portion 509 formed on the further outer periphery of the first flat portion 508 faces and is fixed to a peripheral end portion 152 projected on the further outer periphery of the flat portion 153.

The detailed arrangement of the connector fitting portion A will now be described mainly with reference to FIG. 4B.

The fitting portion A is a substantially quadrangular prism-shaped recessed portion partitioned by a central wall 5106 and opened upward. The terminals 501 (501a and 501b) are projected from the bottom portion 5104 of the recessed portion.

Small projected walls 5101a and 5101b are projected from an inner side wall 5105 in the direction of the central wall 5106 on the outer sides of the terminals 501a and 501b. Large projected walls 5102a and 5102b are projected from an inner side wall 5105 in the direction of the central wall 5106 on the lower sides of the terminals 501a and 501b.

An imaginary line shown by reference numeral 1330 of FIG. 4B denotes the shape of the bottom portion of the connector case 13 that is fixed to the bottom portion 5104 of the connector-case fitting portion A. As is obvious from this arrangement, the reverse-fitting preventive projections 1321a and 1321b formed in the case portion 132 of the connector case 13 are inserted into the reverse-fitting preventive grooves 5103a and 5103b surrounded by the large projected walls 5102a and 5102b and the central wall 5106.

With the adoption of the arrangement above, since the reverse-fitting preventive projections 1321a and 1321b are not fitted in the reverse-fitting preventive grooves 5103a and 5103b when a worker tries to insert the connector case 13 into the connector-case fitting portion A vertically reversely, the worker is able to instantly find the upside-down condition, so that the reverse-fitting is simply preventable. The leading end portions of the small projected walls 5101a and 5101b face the lateral wall of the connector case 13 and play roles as guides when the connector case 13 is fitted in.

Mainly referring FIGS. 5 and 6, the rear back 503 of the back cover 5b has a profile curving and protruding backward. From this rear back, six sheets of reinforcing plates 504 are further protruded backward peripherally at equal intervals (of 60°).

The connector fitting portion (or hole) 502 is a portion for receiving a connector 8 to be connected to the terminal of the power supply cord 9 (see FIG. 7) and is projected in such a predetermined shape as to be surrounded by the reinforcing plates 504.

The arrangement of the connector fitting portion 502 will be described with reference to FIGS. 7A and 7B. The connector fitting portion 502 is strung out of the connector-case fitting portion A and includes an opening 5010 formed into a predetermined shape fit for the shape of the connector 8 of the power supply cord 9.

The terminals 501a and 501b are exposed inside the opening 5010, and positive and negative terminals (not shown) of the power supply cord 9 stored in the connector 8 are connected to the terminals 501a and 501b. Incidentally, reference numeral 5011 shown in FIGS. 6 and 7B denotes a retaining hole for retaining the connector 8. The description of the other reference numerals shown in FIG. 7 will be omitted as they correspond to those shown in FIGS. 4 to 6.

Based on the description given above and by reference to FIGS. 9 and 10, a vehicle lamp with the application of the feeder means embodying the present invention will now be described.

FIG. 9 shows one side portion of a so-called four-lamps type headlamp 10 as seen from the rear back side of the lamp body 7; FIG. 10 shows a horizontal section of the headlamp 10. In this four-lamps type headlamp 10, a bulb 16a for forming a main beam (high beam) and a bulb 16b for forming a sub-beam (low beam) in parallel to each other, are installed therein.

The headlamp 10 includes a first feeder cord 101 connected to a back cover 51 directly drawn from a light source 16a (such an incandescent bulb or a halogen bulb), a first feeder cord 102 drawn from a light source 16b (a discharge bulb) facing a lamp chamber 122, and a second feeder cord 201 connected to a back cover 52 connected to the first feeder cord 102 via a ballast 401 (see FIG. 11).

The terminals of feeder cords 101 and 102 are stored in the connector case 13 and respectively inserted into connector-case fitting portions A' and A" formed in the back covers 51 and 52. Power supply cords 91 and 92 conducting over a power supply (not shown) via connector members are introduced into connector fitting portions 5021 and 5022 for use as power-source connection that are formed in the rear top portions of the respective back covers 51 and 52. Reference numeral 18 denotes a movable reflector that is disposed in lamp chambers 121 and 122 and tiltably supported by an aiming mechanism.

The arrangement of the aiming mechanism will briefly be described. This mechanism includes a pair of lateral aiming screws S1 and S2 passed through screw inserting holes (not shown) formed in the back wall of a lamp body 701 and extended horizontally and longitudinally, nut members (not shown) respectively fitted to a pair of lateral brackets (not shown) in the upper back area of the reflector 18 and screwed into the aiming screws S1 and S2, and an auto-leveling actuator LM held between the lower back of the reflector 18 and the lamp body 701.

With the arrangement above, the reflector 18 is vertically and automatically tilted around a leveling axis Lx by the auto-leveling actuator LM for moving back and forth a retractable rod (not shown) extending longitudinally according to a signal from a predetermined gravity-position movement detection sensor (not shown) of an automobile, whereby the optical axis of the reflector 18 is so adjusted that it becomes constant with respect to a vehicular axis.

The optical axis of the reflector 18 is also laterally tilted for adjustment by tilting the reflector 18 around the vertical tilting axis shown by Ly by pivoting the aiming screws S1 and S2. However, the aiming mechanism is not limited to the arrangement above.

Reference numerals 14a and 14b denote connectors for fitting the light source; reference numeral 19 refers to a shade for effectively reflecting the light emitted from the light source 16b; and reference numeral 20 refers to a front lens fitted to the lamp body 701.

Thus, the vehicle lamp according to the invention is provided with the auto-leveling and aiming mechanisms, whereby the rear area of the light source is narrowed and this is especially applicable for a reflector-moving type discharge headlamp that tends to restrict the mounting operation.

The sub-beam forming bulb 16b of the four-lamps type headlamp 10 will now be described in detail by reference to FIG. 11 which shows a side view of the bulb 16b.

The sub-beam forming bulb 16b is a discharge bulb including the actuator and its ballast 401 is disposed externally on the lamp body 701.

More specifically, the lamp body 701 forming the lamp chamber 122 is fitted to the front lens disposed on the front side and in the lamp chamber 122, the discharge lamp 16b tiltably supported by the aiming mechanism (not shown) is disposed toward the front lens 20. Around the discharge lamp 16b are the reflector 18 surrounding the discharge lamp 16b, and the shade 19 for causing the light emitted from the discharge lamp 16b to be effectively reflected by the reflector 18.

In the rear of the discharge lamp 16b, the connector 14b is fitted to the insulating base 27 of the base of the discharge lamp 16b. The first feeder cord 102 is drawn from a cord connection 17 projected from the side of the connector 14b, passed through a cord hole 23 formed in the lower portion of the lamp body 701 and connected to the ballast 401 disposed in a space 21 formed by a separating member 22 fitted to the underside of the lamp body 701. This ballast 401 incorporates a lighting circuit unit and a ballast circuit (both not shown) of the discharge lamp 16b.

The second feeder cord 201 is drawn upward from the ballast 401 through the cord hole 23. The terminal of the second feeder cord 201 is connected via the connector case 13 shown by an imaginary line to the terminal 501 provided to the back cover 52 fitted in the opening formed in the rear top portion of the lamp body 701 via an O-ring 30b.

Reference numeral 25 denotes an extension reflector for covering the gap between the reflector 18 and the lamp body 701; and 26, a member for supporting the discharge lamp 16c and also a lead support projecting forward toward the insulating base 27.

As set forth above, the connector 14b is fitted to the rear of the light source 16b and even when the discharge bulb 16b is employed with the ballast 401 disposed outwardly on the lamp body 701, the vehicle lamp according to the invention is applicable.

A modified embodiment of the vehicle lamp equipped with the discharge lamp will now be described with reference to FIG. 12.

A lighting circuit unit portion 24 to be connected to the discharge lamp 161 is fitted to the rear of an insulating base 271 provided to the base of the discharge lamp 161. A first feeder cord 103 is drawn downward from the lighting circuit unit portion 24, passed through a cord hole 231 formed in the lower portion of a lamp body 702 and connected to a ballast 402 disposed in a space 211 formed with a separating member 221 on the underside of the lamp body 702.

With respect to the ballast 402 according to this modified embodiment, only a ballast circuit is shown as what is a built-in one as a lighting circuit unit (not shown) is incorporated in the lighting circuit unit portion 24.

A second feeder cord 202 is drawn upward from the ballast 402 through the cord hole 231. A terminal of the second feeder cord 202 thus drawn upward is disposed on the rear side of the lighting circuit unit portion 24 and connected via a connector case 131 shown by an imaginary line to the terminal 501 provided to a back cover 53 fitted in an opening formed in the rear top portion of the lamp body 702 via an O-ring 301.

As shown in the modified embodiment, the lighting circuit unit member, its peripheral member and the like are provided in the rear of the discharge lamp 161. This arrangement, with a narrowed area in the rear of the discharge lamp 161 and only the ballast circuit contained in the ballast 402, can be applied to the vehicle lamp according to the present invention.

The invention disclosed by the present application has the following effect:

(1) The back cover employed in the vehicle lamp according to the invention functions as a relay member for connecting the terminal of the feeder cord to the cord terminal conducting over the power supply, thus greatly simplifying the complicated work of disposing the feeder cords in the peripheral area of the lamp body. Moreover, as the feeder means provided via the back cover is applicable to a wide range of vehicle lamps, it contributes to uniformity in the designing of the rear back of the lamp body.

Particularly in the vehicle lamp provided with the movable reflector for reflecting the light emitted from the light source in the lamp chamber inside the lamp body, the area in the lamp chamber or in the rear of the light source is made narrower because of the movable reflector in the lamp chamber. Accordingly, the work of disposing the feeder member is restricted, so that the means of connecting the feeder cord and the power supply cord via the back cover becomes more effective.

(2) As the flag-type terminal is employed at the terminal of the feeder cord, the feeder cord is extended and easily connected to the back cover, whereby the work of disposing the feeder member can be made more efficiently.

(3) Since the terminal of the feeder cord is stored in the connector case so as to do the work of connecting the positive and negative terminals of the feeder cord to the positive and negative terminals of the back cover at one time instead of twice, the work of disposing the feeder member can be done efficiently and simply. Moreover, because the terminal provided to the terminal of the feeder cord is never exposed, measures to counter fire hazard can be effectively taken.

(4) The connector case and the back cover are so devised that the terminal of the feeder cord may be prevented from being reversely connected to the terminal of the back cover, whereby the reverse-fitting is simply preventable, and measures to counter fire hazard can be effectively taken.

In other words, the reverse-fitting preventive region is provided on the outer wall of the case forming the connector case, and the area for receiving the reverse-fitting preventive region is formed in the back cover. The reverse-fitting preventive regions are not fitted in the predetermined respective regions of the back cover when it is attempted to reversely insert the connector case into the back cover so as to ensure that the reverse-fitting is prevented. Moreover, as any worker is able to instantly find the reverse-fitting, improvement in workability is also assured.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A vehicle lamp, comprising:

a movable reflector tiltably supported by a lamp body via an aiming mechanism, wherein a back cover is detachably fitted in an opening formed in the rear back of said lamp body, and wherein said back cover includes a terminal for connecting a terminal of a feeder cord connected to a light source provided in said lamp body and a terminal of a power supply cord connected to a power supply for supplying power to said light source, wherein said feeder cord includes a first feeder cord connected to a discharge bulb forming the light source, and a second feeder cord drawn from a discharge circuit unit to which said first feeder cord is connected, and wherein said terminal of said feed cord comprises a flag-type terminal extending in a direction perpendicular to the longitudinal direction of said feeder cord.

2. A vehicle lamp according to claim 1, wherein said feeder cord is connected to the terminal of said back cover via a connector case for storing the terminal of said feeder cord.

3. A vehicle lamp according to claim 2, wherein said connector case and said back cover are arranged so that the terminal of said feeder cord is prevented from being reversely connected to said back cover, and wherein a reverse-fitting preventive region is provided on the outer wall of a case forming said connector case, and an area for receiving said reverse-fitting preventive region is formed in said back cover.

4. A vehicle lamp, comprising:

a movable reflector tiltably supported by a lamp body via an aiming mechanism, wherein a back cover is detachably fitted in an opening formed in the rear back of said lamp body, wherein said back cover includes a terminal for conducting a terminal of a feeder cord connected to a light source provided in said lamp body and a terminal of a power supply cord connected to a power supply for supplying power to said light source, wherein said connector case and said back cover are arranged so that the terminal of said feeder cord is prevented from being reversely connected to said back cover, and wherein a reverse-fitting preventive region is provided on the outer wall of a case forming said connector case, and an area for receiving said reverse-fitting preventive region is formed in said back cover.

5. A vehicle lamp, comprising:

a movable reflector tiltably supported by a lamp body via an aiming mechanism, wherein a back cover is detachably fitted in an opening formed in the rear back of said lamp body, wherein said back cover includes a terminal for conducting a terminal of a feeder cord connected to a light source provided in said lamp body and a terminal of a power supply cord connected to a power supply for supplying power to said light source, wherein said connector case and said back cover are arranged so that the terminal of said feeder cord is prevented from being reversely connected to said back cover, wherein said connector case and said back cover are arranged so that the terminal of said feeder cord is prevented from being reversely connected to said back cover, and wherein a reverse-fitting preventive region is provided on the outer wall of a case forming said connector case, and an area for receiving said reverse-fitting preventive region is formed in said back cover.

6. A vehicle lamp comprising:

a movable reflector tiltably supported by a lamp body via an aiming mechanism, wherein a back cover is detachably fitted in an opening formed in the rear back of said lamp body, wherein said back cover includes a terminal for connecting a terminal of a feeder cord connected to a light source provided in said lamp body and a terminal of a power supply cord connected to a power supply for supplying power to said light source, wherein said feeder cord is connected to the terminal of said back cover via a connector case for storing the terminal of said feeder cord, wherein said connector case and said back cover are arranged so that the terminal of said feeder cord is prevented from being reversely connected to said back cover, and wherein a reverse-fitting preventive region is provided on the outer wall of a case forming said connector case, and an area for receiving said reverse-fitting preventive region is formed in said back cover.

* * * * *